(12) United States Patent
Ide

(10) Patent No.: US 6,966,207 B2
(45) Date of Patent: Nov. 22, 2005

(54) SHAPE DETECTING APPARATUS

(75) Inventor: Kenichi Ide, Chiyoda-ku (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 43 days.

(21) Appl. No.: 10/699,677

(22) Filed: Nov. 4, 2003

(65) Prior Publication Data

US 2004/0194520 A1 Oct. 7, 2004

(30) Foreign Application Priority Data

Apr. 2, 2003 (JP) .............................. 2003-098708

(51) Int. Cl.[7] .............................................. B21B 37/28
(52) U.S. Cl. ........................ 72/9.1; 72/11.7; 73/862.07
(58) Field of Search ........................... 72/8.6, 9.1, 11.4, 72/11.7, 12.3; 73/159, 862.07

(56) References Cited

U.S. PATENT DOCUMENTS

| 3,581,536 A | * | 6/1971 | Terwilliger ................. 72/8.7 |
| 4,004,459 A | * | 1/1977 | Greenberger ............ 73/862.07 |
| 4,116,029 A | * | 9/1978 | Fabian et al. ............... 72/31.01 |
| 4,188,809 A | * | 2/1980 | Ishimoto et al. ............. 72/11.4 |
| 4,512,170 A | * | 4/1985 | Hsu ............................ 72/11.7 |
| 4,680,978 A |   | 7/1987 | Ginzburg et al. |
| 4,972,706 A | * | 11/1990 | Adolfsson et al. ............ 73/159 |

FOREIGN PATENT DOCUMENTS

| DE | 197 15 523 A1 | 10/1998 |
| DE | 197 32 862 A1 | 2/1999 |
| JP | 60-234709 | 11/1985 |
| JP | 62-047530 | 3/1987 |
| JP | 10-137831 | 5/1998 |
| JP | 10-314821 | 12/1998 |
| JP | 2003-504211 | 2/2003 |

OTHER PUBLICATIONS

Abstract of EP 03025377.7 as modified by Search Division, European Patent Office.
European Search Report, completed Dec. 2, 2003, by M. Forciniti, in Munich, and mailed Dec. 29, 2003.

* cited by examiner

Primary Examiner—Ed Tolan
(74) Attorney, Agent, or Firm—Griffin & Szipl, P.C.

(57) ABSTRACT

A shape detecting apparatus for controlling the tension of a rolled plate, is composed of a pair of fixing members, a supporting frame and a plurality of shape detecting units. The shape detecting units are fixed detachably in a close proximity of the supporting frame in the lateral direction. The shape detecting units are each composed of cylindrical divided rolls in contact with the rolled plate, a fixed member fixed on the supporting frame, an arm member of which one end supports the divided roll rotatably, and of which the other end is fixed on the fixed member, and a load detector for detecting a moment of rotation acting on the arm member.

10 Claims, 8 Drawing Sheets

SHAPE DETECTING APPARATUS

BACKGROUND OF THE INVENTION

1. Technical Field of the Invention

The present invention relates to a shape detecting apparatus for detecting the distribution of tensions in the lateral direction at a hot rolling line.

2. Description of the Related Art

As a means for detecting the distribution of lateral tensions at a rolling line, Patent Literatures 1 to 5 have been applied heretofore.

The "Shape control apparatus" of [Patent Literature 1] is shown in FIGS. 1A and 1B. A roller 51 is installed rotatably at the tip portion of a torsion bar 52 using a pin 53, and a pin 54 is equipped at the base portion of this torsion bar 52 and is fixed to a bracket 55. On a fixing portion 56 of the bracket 55, a strain-measuring gauge, e.g. a strain gauge 57 is attached to compose a tension detect element 58. In FIG. 1B, 59 is a lead wire to conduct an electric signal (detection signal) from strain gauge 57.

The "Shape detecting apparatus" of [Patent Literature 2] is shown in FIG. 2. Every time a roll 61 rotates by one turn, the center of a load detector 62 comes close to a location where the roll begins to contact a metal strip, then a position detector 67 outputs a command signal which is given to first and second holders 65, 66 and a delay circuit 68. Then the delay circuit 68 gives a command signal to the first holder 65 after a predetermined time from the command signal.

On the other hand, when the first holder 65 is given a command signal from the position detector 67, the holder is reset before the metal strip is applied to the load detector 62, and when a command signal is given to the holder from the delay circuit 68, the holder holds each load signal immediately before the center of the load detector comes right underneath the load.

The second holder 66 holds a peak value of detection values when the center of the load detector passes the point just below the load due to the metal strip. A calculator 69 obtains the tension of the metal strip based on load signals once held at both holders and then given to the calculator. Therefore, variations in the tension of the metal strip can precisely be determined. In FIG. 2, 63 and 64 represent an amplifier and a slip ring respectively.

The "Shape measuring roller" of [Patent Literature 3] is shown in FIG. 3. A shape measuring roller is composed of a horizontal supporting shaft 72, a rotating rotor 74, a pressure detector (not shown), a shifting device 76 and a calculating controller 78.

The rotating rotor 74 is supported rotatably on the supporting shaft 72 using air bearings and is disposed adjacently. The pressure detector detects air pressure at the inner surface of the rotor 74. The shifting device 76 moves the supporting shaft 72 in the axial direction. The calculating controller 78 calculates a width x by which both ends of rolling strip 71 respectively contact the rotating rotor and controls the shifting apparatus. When the contact width x is smaller than ½ of the width B of the rotating rotor that ends of the rolling strip come in contact with, the supporting shaft 72 is moved in the axial direction by a predetermined distance by the shifting device 76.

The "Flatness measuring roller" of [Patent Literature 4] is shown in FIGS. 4A and 4B. The roller is formed as a looper adjustable in the direction of a strip, and this looper is provided with many measuring regions that exist in parallel laterally over the entire strip. In this flatness measuring roller, the measuring region is composed of measuring rollers 89 that can cooperate with dynamic force measuring devices which can turn clockwise, and as supported rotatably. Each measuring roller 89 is supported with bearings inside a swinging housing-type lever framework 83. In FIGS. 4A and 4B, symbolic numbers are 82 for the shaft, 85 for a swing axial line, 86 for a rotating value former, 80 for a guide panel, 84 for a power introducing point, and 81 for the power measuring apparatus.

The "Rolled steel strip flatness detecting apparatus" of [Patent Literature 5] is shown in FIG. 5. The apparatus is a contact-type flatness detecting apparatus for detecting the flatness of a rolled strip at a steel strip manufacturing rolling process, using a contact load of the rolled steel strip S, applied to a divided roll 92 of a looper apparatus 90.

The apparatus incorporates a tangential-direction adjusting means 94, a load sensor impact absorbing means 96 and a pre-pressure applying means 98. The tangential-direction adjusting means 94 adjusts the divided roll 92 by turning a surface point up and down. The load sensor impact absorbing means 96 prevents an impact applied to the divided roll from being transferred to a load sensor. The pre-pressure applying means 98 fixes the load sensor, houses a base and a sensor cap that are fixed in the looper apparatus, connects mutually supporting bases that can turn around a center of a fixing shaft, and pressurizes the above-mentioned supporting bases to a base unit with a predetermined pressure.

[Patent Literature 1]
Japanese patent official publication No. 86290, 1993

[Patent Literature 2]
Japanese patent official publication No. 40038, 1994

[Patent Literature 3]
Unexamined Japanese patent publication No. 137831, 1998

[Patent Literature 4]
Unexamined Japanese patent publication No. 314821, 1998

[Patent Literature 5]
Japanese patent publication No. 504211, 2003

However, the aforementioned conventional shape detecting apparatus involve the following problems.

(1) Normally at a hot rolling line, a looper apparatus is installed to control tensions. If a shape detecting function has to be added to an existing looper apparatus, the above-mentioned conventional shape detecting apparatus need to replace the whole equipment.

(2) Because a load cell is arranged in the looper arm, the same number of looper arms as the number of the divided rolls is required, resulting therefore in a large weight and GD2 of the entire looper, so the looper cannot quickly respond to a control command.

(3) Because of a long looper arm (lever framework length), if the width of a roll is made small, the lateral toughness thereof is lost (small tread length), the roll may deteriorate in the life or be damaged due to a lateral shifting force of a rolled plate.

(4) Because the rotation fulcrum and the dynamic force measuring point (load measuring point) of the lever framework are exposed, the equipment might be subject to aging and aggravation in measuring accuracy in an adverse environment.

(5) If the width of a rolled plate is less than one half of the roll width, the shape measuring roll may tilt by a moment acting, and detection accuracy become lower.

(6) The inner periphery and the bearing of the measuring roll directly contact each other, so heat can be easily transferred from outside the roll, resulting in deterioration of bearing life or damage thereof due to a temperature rise.

(7) Because a measuring roll corresponds to a load cell, if a load cell fails, measurements stop.

(8) A measuring roll contacts a rolled plate and is driven by the material. If the roll is quickly accelerated from a stopped state, it may slip and flaws the rolled plate and make unevenly wearing the roll. Once an uneven wear is produced, it is quickly accelerated, and the roll soon becomes unrotatable. Also, unless the roll is rotating, the roll is cooled unevenly with cooling water, resulting in uneven distribution of temperatures on each part of the roll, so the roll may deform and the aforementioned problems occur.

(9) The measuring system can be affected easily by temperatures of a rolled plate, therefore, a measurement error may be caused because of temperature variations.

SUMMARY OF THE INVENTION

The present invention aims at solving the aforementioned problems. That is, the present invention provides a shape detecting apparatus that (1) the weight of an entire looper device can be reduced while an increase of GD2 can be made small, and a quick response to a looper control command can be maintained, (2) the toughness of the apparatus in the lateral direction is high, and the apparatus is resistant to a life shortening or a damage caused by the lateral shifting of a rolled plate, (3) a rotation fulcrum and a force measuring point (load measuring point) are not exposed, so the apparatus is durable under adverse conditions in terms of aging and worsening of measurement accuracy, (4) even if the widthwise end portion of the rolled plate is less than one half of the width of rolls, a moment acting to the shape measuring roll is small and a degradation of detection accuracy can be prevented, (5) heat from outer surfaces of rolls is not easily transferred to the bearing, and the bearing is immune to a temperature rise in view of shortening of life and damage, (6) a plurality of load cells can be installed per each measurement roll, so the cells can back up measurements, (7) slipping between a roll and the rolled plate is minimized, while preventing the rolled plate and rolls from being flawed and unevenly abraded, and the rolls and the rolled plate can be prevented from being deformed due to a temperature difference in the rolls, (8) the apparatus is not easily adversely affected by heat transferred from the rolled plate, and measurement errors caused by temperature variations are small, and (9) a shape detecting function can be added to an existing looper device, without requiring to replace the entire apparatus.

The present invention offers a shape detecting apparatus for controlling the tension of a rolled plate, comprising; a pair of fixing members that are fixed to a pair of installation members 12' respectively, a support frame of which both ends are supported by the fixing members, and which extends laterally, and a plurality of shape detecting units that are fixed detachably on the support frame, adjacently thereto in the lateral direction, the shape detecting unit comprises; a cylindrical divided roll in contact with the rolled plate, a fixed member that is fixed on the support frame, an arm member of which one end rotatably supports the divided roll, and of which the other end is fixed on the fixed member, and a load detector for detecting a moment of rotation that acts on the arm member.

According to the aforementioned configuration of the present invention, a plurality of shape detecting units are detachably fixed on the supporting frame, laterally adjacent thereto, so each unit can be replaced independently to facilitate maintenance.

According to a preferred embodiment of the present invention, the aforementioned pair of fixed members is configured such that the pair can replace looper rolls of a looper device and installed.

By virtue of this configuration, a shape detecting function can be added to an existing looper device without replacing the entire device.

The above-mentioned looper device is composed of a pair of looper arms that support a looper roll at one end, and a load cell for detecting force acting to the looper roll, installed between the fulcrum for supporting the aforementioned looper arm and the above-mentioned one end.

Thus configured, a shape detecting function can be added to an existing looper device without replacing the whole device, even when force acting to the looper roll is to be detected, in the same way as with a non-detecting looper device.

According to another preferred embodiment of the present invention, the above-mentioned supporting frame is provided at the far side from the fulcrum of supporting the looper device, thereby the whole shape detecting unit is installed at the far side from the aforementioned supporting fulcrum.

Using this configuration, when the shape detecting apparatus is installed in place of the looper roll of an existing looper device, a protruded portion to the side of supporting fulcrum of the looper device can be substantially eliminated, so interference with the existing equipment can be suppressed to a minimum.

The other end of the above-mentioned arm member is installed on the fixed member, can swing, and is provided with a roll height adjusting device that adjusts the height of the divided roll by controlling a swing angle of aforementioned the other end.

In this configuration, the height of each divided roll can be adjusted to the same height by controlling a swing angle of the other end portion of the arm member using a roll height adjusting device.

Each of the above-mentioned divided rolls is provided with a rotation shaft for transmitting rotating force as the roll separably contacts the adjacent divided roll. The aforementioned rotating shaft separably contacts the driving shaft of a roll driving device which is installed at the above-mentioned fixed member, and is rotated.

Using this configuration, each divided roll is rotated by the roll driving device and rotates in advance, so as to minimize slipping between the roll and the rolled plate, while preventing the rolled plate and the rolls from being flawed and unevenly worn and preventing their deformation due to temperature differences in the rolls.

There is a bearing of which the inner ring supports the rotating shaft of the above-mentioned divided roll. The outer ring of the aforementioned bearing is supported by one end portion of the above-mentioned arm member.

In this configuration, the bearing can be shielded from heat transferred from the outer periphery of the roll, so the bearing can be made immune to the shortening of life caused by a temperature rise of the bearing, and damage. In addition, the load detector is made also resistant to a temperature from the rolled plate, so measurement errors caused by temperature variations can be made small.

The aforementioned arm member is composed of a pair of arm panels that support both ends of the divided roll. The above-mentioned load detector is disposed at both ends of the aforementioned divided roll and/or the above-mentioned arm panel.

Configured as described above, the lateral toughness of the divided roll can be made high, and life shortening and damage of the rolled plate, caused by transverse shifting of the rolled plate can be avoided. Even if the widthwise end portion of the rolled plate is less than one half of the roll width, the moment acting on the shape measuring roll is so low that detection accuracy can be prevented from being lowered. Furthermore, a plurality of load cells can be installed for a measuring roll, to back up a measurement. Moreover, load cells can be arranged only in a necessary area according to the width of the rolled plate.

Divided rolls that are in contact with edges of the rolled plate are determined by a calculation, and a tension acting from end positions of the aforementioned divided rolls to the above-mentioned divided rolls is detected also by another calculation.

In this configuration, a tension acting to divided rolls that contact the edges of the rolled plate can also precisely be detected.

At a sliding portion of the above-mentioned shape detecting unit is provided with a seal member to prevent scale, fluids, etc. from entering from outside.

Taking advantage of this configuration, the fulcrum of rotation and the power measuring point (load measuring point) can be prevented from being exposed, so the shape detecting unit can be made highly resistant to aging deterioration and worsening of measurement accuracy even in an adverse environment.

In addition, since the shape detecting unit can be small and light, the weight of the entire looper device can also be small while preventing an increase of GD2, therefore, the response time to a looper control command can be kept short.

Other objects and advantages of the present invention are revealed referring to the attached drawings.

DESCRIPTION OF THE PREFERRED EMBODIMENTS

Preferred embodiments of the present invention are described referring to the attached drawings. All common members in each figure are identified with the same numbers.

Figure 1A:
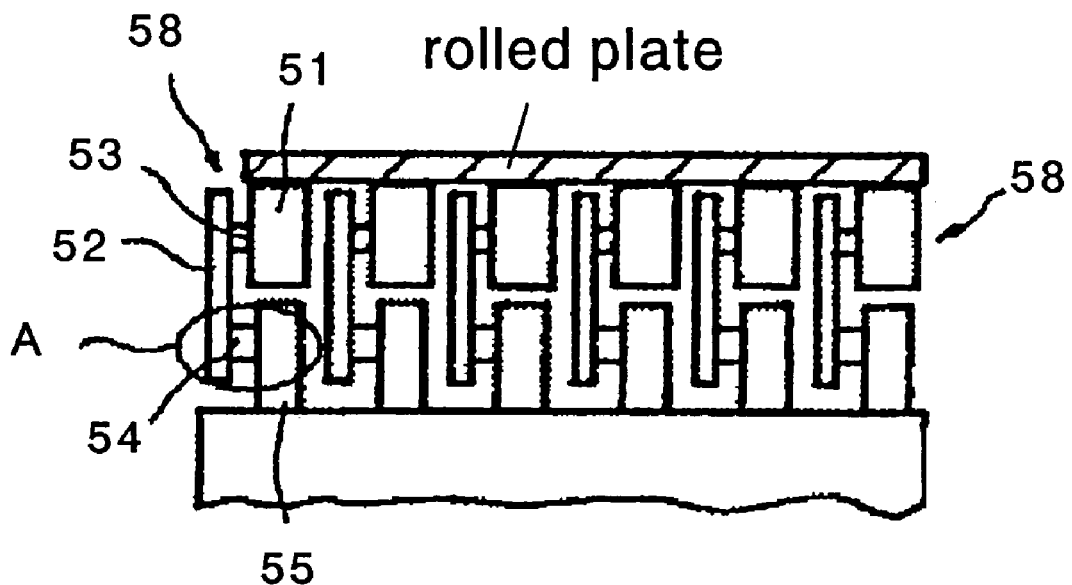
FIGS. 1A and 1B show a configuration of a conventional shape detecting device.
Figure 1B:
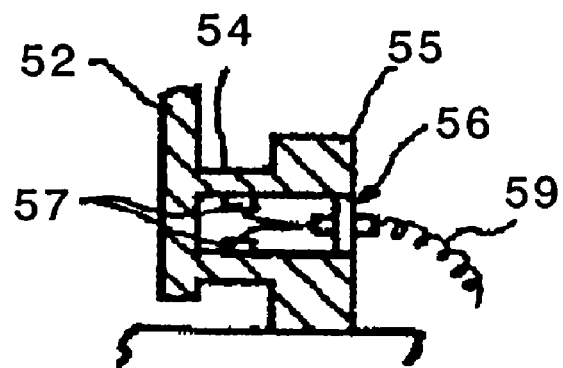
Figure 2:
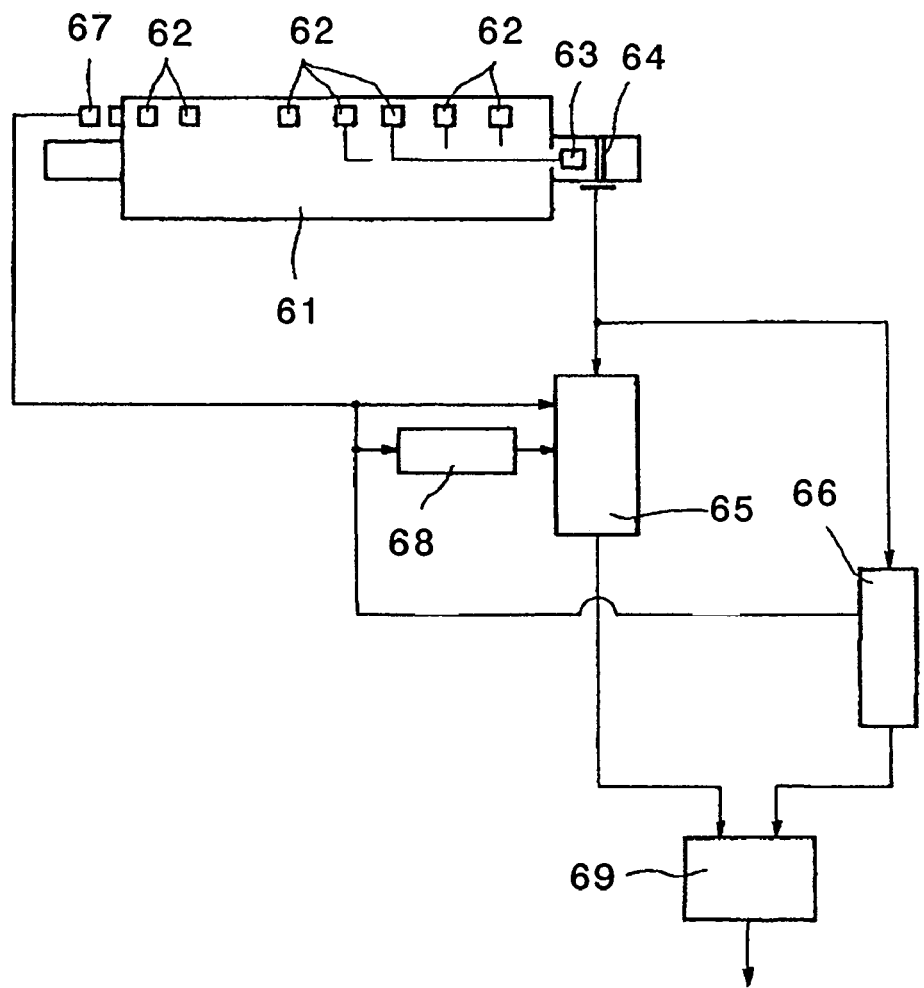
FIG. 2 is a configuration view of another conventional shape detecting device.
Figure 3:
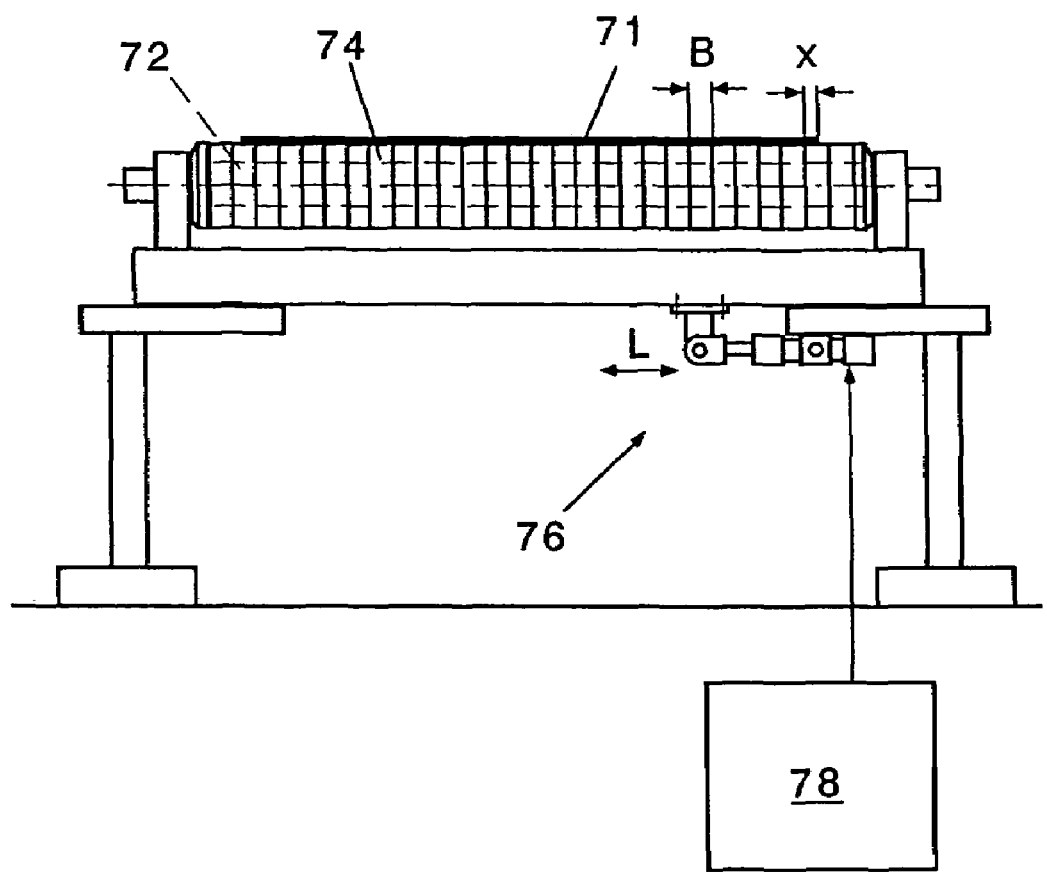
FIG. 3 shows a configuration of another conventional shape detecting device.
Figure 4A:
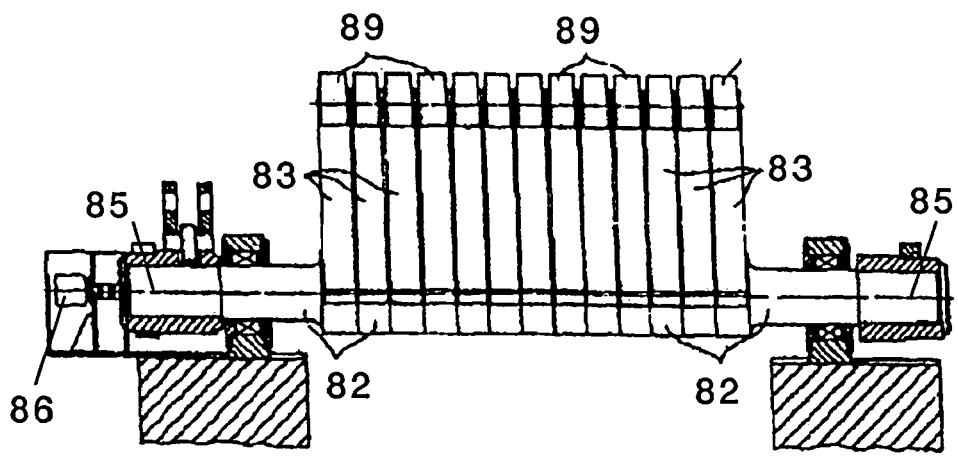
FIGS. 4A and 4B are configuration views of another conventional shape detecting device.
Figure 4B:
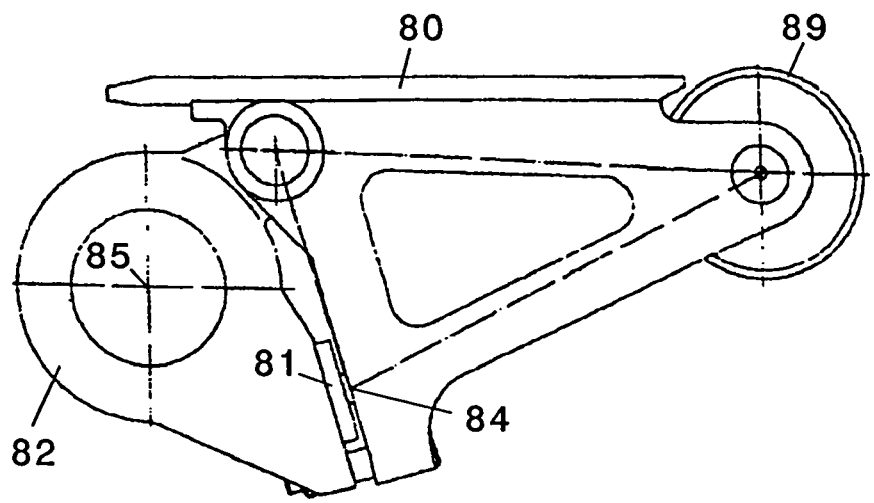
Figure 5:
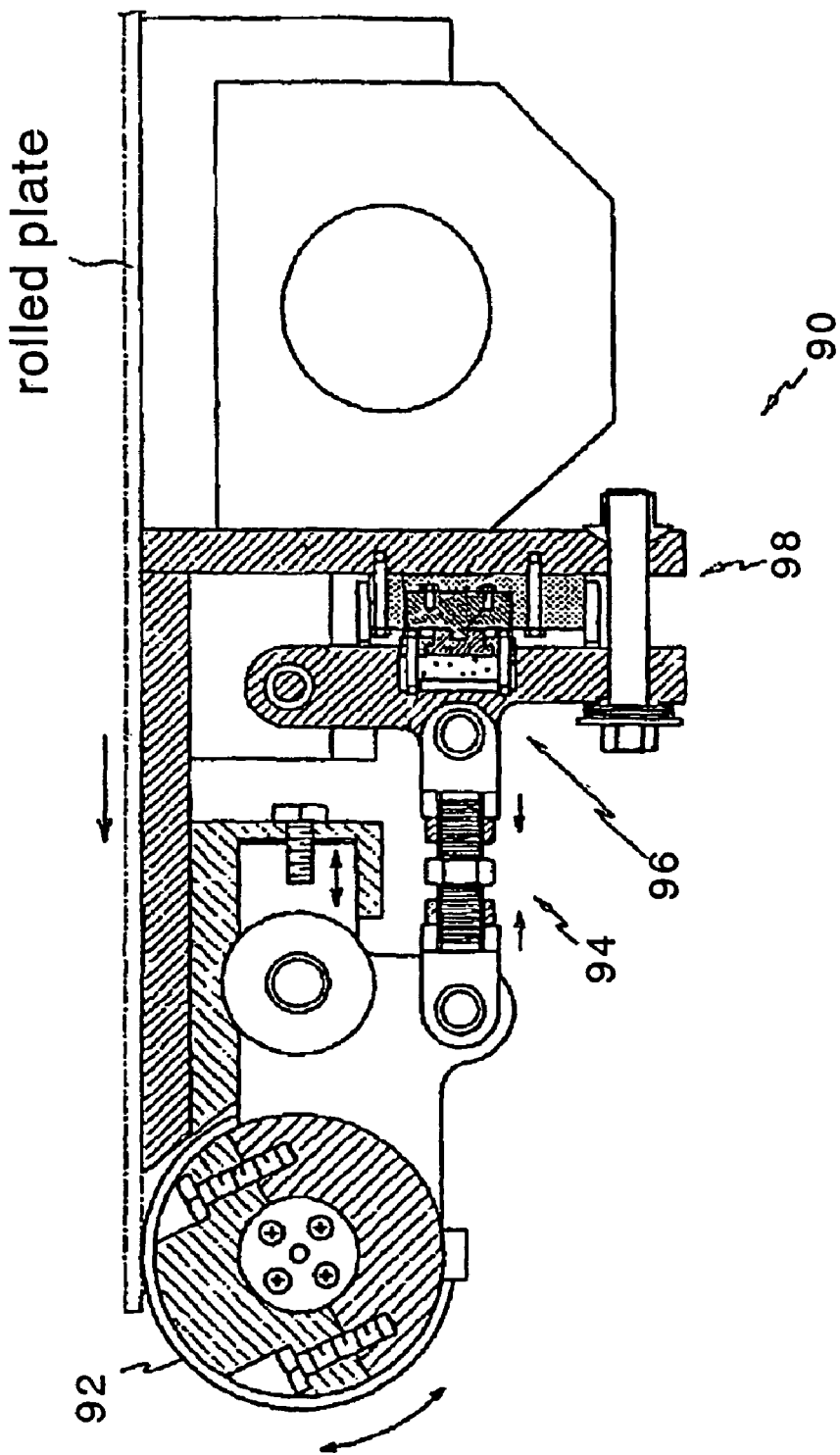
FIG. 5 shows a configuration of another conventional shape detecting device.
Figure 6:
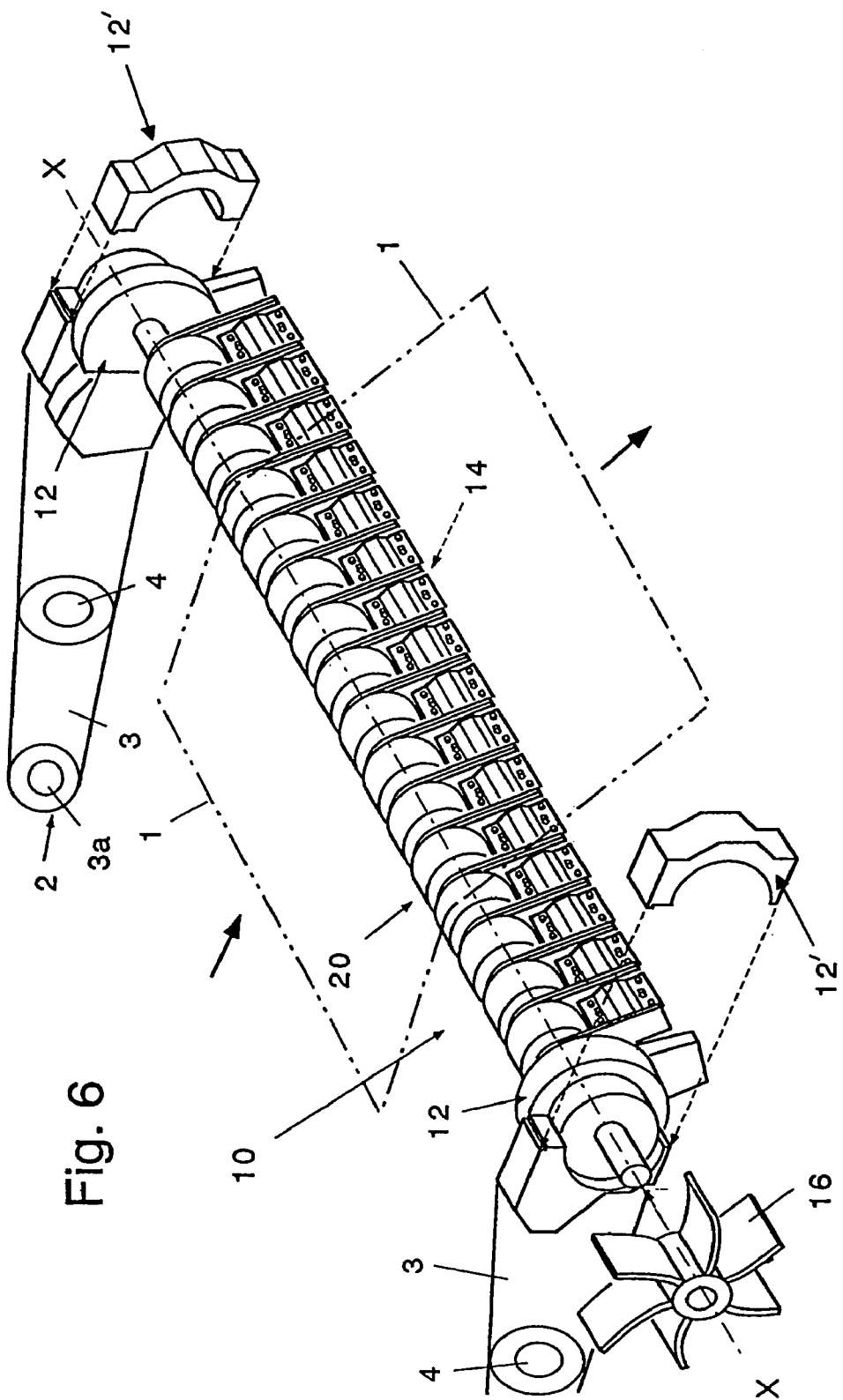
FIG. 6 is an isometric view of a shape detecting apparatus according to the present invention.

FIG. 6 is a general isometric view of a shape detecting apparatus according to the present invention. In FIG. 6, the shape detecting apparatus 10 according to the present invention is configured installable by replacing a looper roll (not illustrated) of a looper device 2 that controls the tension of a rolled plate 1. Looper device 2, in this example, is provided with a pair of left and right looper arms 3 that support both ends of the looper roll, and load cells 4 are installed between a fulcrum 3a for supporting looper arm 3 and one end that supports the looper roll, and detect force acting on the looper roll. Therefore, this looper device 2 can detect the force acting on the entire shape detecting apparatus 10 using load cells 4 even when the looper roll is replaced with the shape detecting apparatus 10 according to the present invention, and can control tensions of rolled plate 1.

In addition, the shape detecting apparatus 10 of the present invention can also be installed even at looper device 2 that is not provided with load cells 4, so the apparatus can succeed the tension control function of looper device 2, as it stands.

In FIG. 6, the shape detecting apparatus 10 according to the present invention is composed of a pair of fixing members 12, a supporting frame 14 and a plurality of shape detecting units 20.

The pair of fixing members 12 is fixed at both ends of looper device 2, where both ends of the looper roll are installed at the installation members 12', so as not to rotate about axial line X—X thereof.

The supporting frame 14 extends in the lateral direction, and both ends of the supporting frame 14 are supported by the pair of fixing members 12.

The plurality of shape detecting units 20 are rotatably fixed adjacent to supporting frame 14 in the lateral direction. Also, this supporting frame 14 is provided with a wiring duct (not illustrated) that extends laterally and can be sealed. By means of this duct, signal wires are protected from an adverse environment, and while avoiding aging deterioration and worsening of measurement accuracy, detection signals are picked out to outside from each shape detecting unit 20.

As shown in FIG. 6, supporting frame 14 is equipped at the side far from supporting fulcrum 3a of looper device 2, thereby the whole shape detecting units 20 is installed far from supporting fulcrum 3a. Therefore if the units are installed in place of looper rolls of an existing looper device, substantially no members protrude any longer to the supporting fulcrum side of the looper device, thus interference with the existing facilities is minimized.

Figure 7:
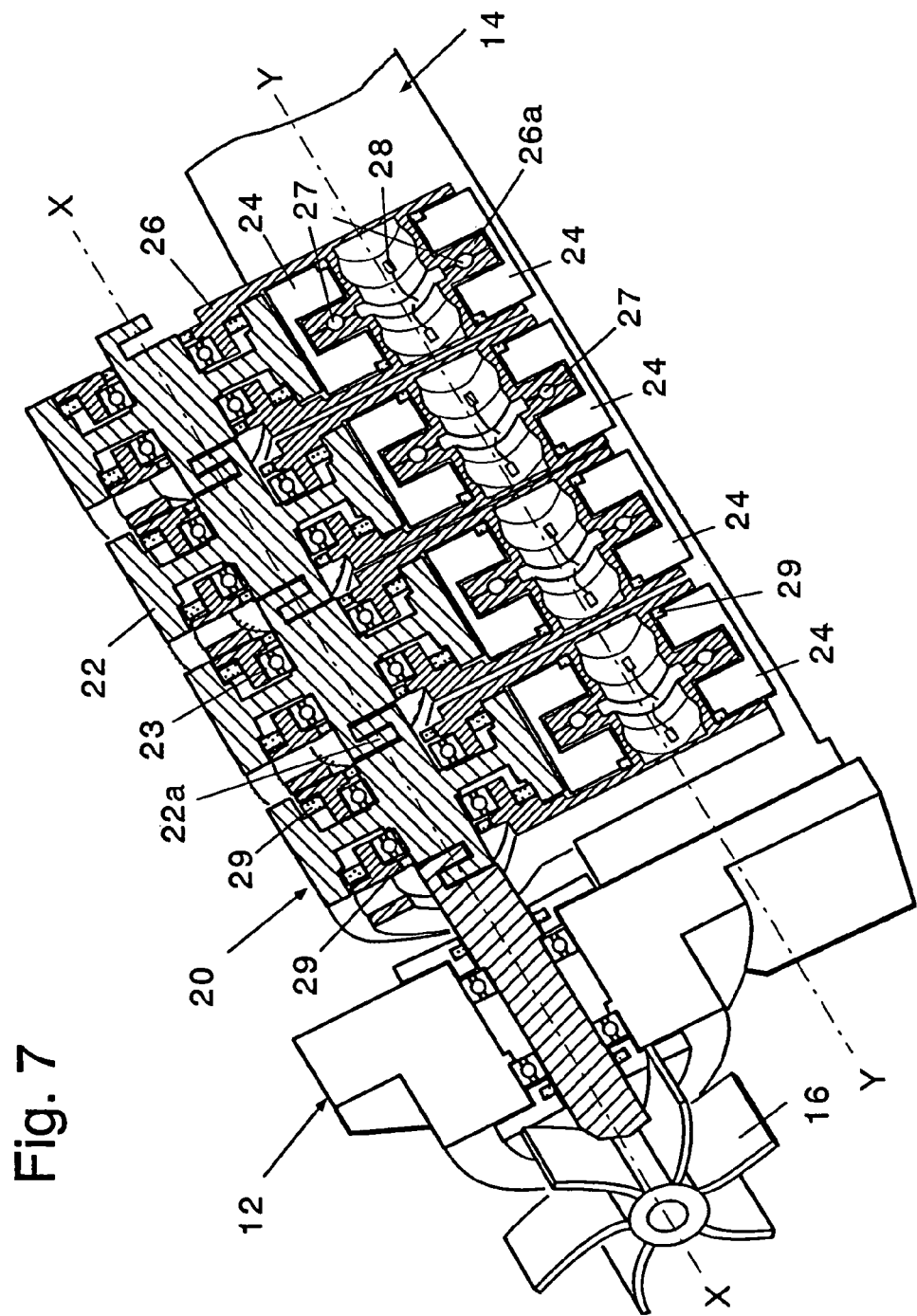
FIG. 7 is a partial cutaway view of FIG. 6.
Figure 8:
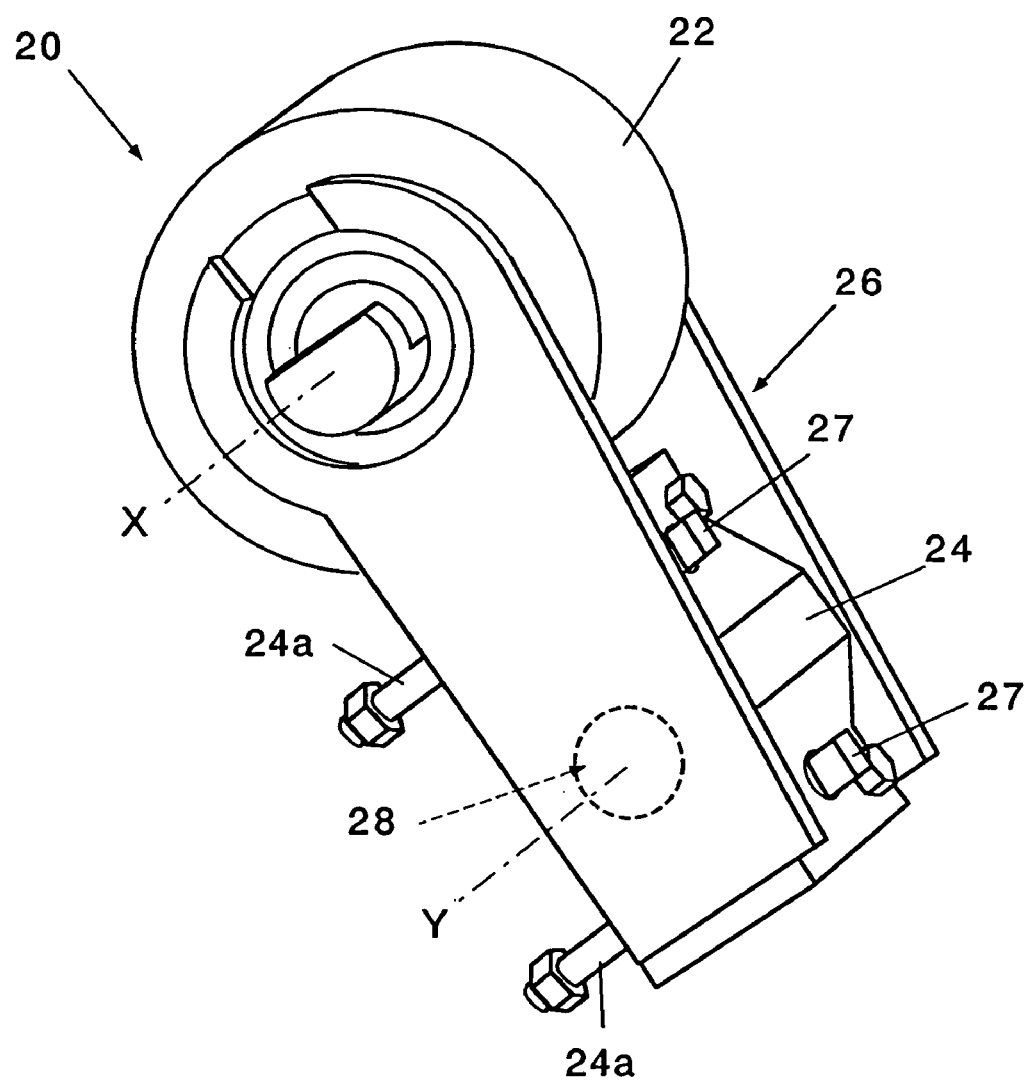
FIG. 8 is another isometric view of the shape detecting unit.

FIG. 7 shows a partial cutaway section related to FIG. 6, and FIG. 8 is an isometric view of the shape detecting unit.

As shown in FIGS. 7 and 8, shape detecting unit 20 is composed of cylindrical divided rolls 22, fixed members 24, arm members 26 and load detectors 28.

The outer shape of the cylindrical divided roll 22 is such that a looper roll is cut across the axial line X—X thereof, and the divided rolls 22 are located in place of the looper roll and come in contact with rolled plate 1.

Fixed members 24 are fixed by tightening device 24a (bolts, nuts, etc.) closely to supporting frame 14.

The arm member 26 supports divided roll 22 rotatably at one end thereof, and the other end of the member is fixed at fixing member 24.

The load detector 28 is, for instance, a strain gauge, and is installed onto the arm member, and detects a moment of rotation from a strain acting on the member.

The other end of the arm member 26 is installed at the fixed member 24, in such a manner that the arm can swing about axial line Y—Y in parallel with the axial line X—X. The other end of the arm member 26 is provided with a protrusion portion 26a that can swing around the axial line Y—Y in fixed member 24. This protrusion portion 26a is structured such that a swing angle thereof can be adjusted about axial line Y—Y using a roll-height adjusting device 27 (for example, a bolt) screwed to fixed member 24. In this configuration, heights of each divided roll 22 can be adjusted to the same level by controlling a swing angle of the other end of arm member 26 using roll-height adjusting device 27.

As shown in FIG. 7, each divided roll 22 is provided with a plane parallel to axial line X—X at an end portion 22a of the rotating axis thereof, whereby the roll separably contacts adjacent divided rolls and transmits rotating force thereto. Also, this rotating axis separably contacts the driving shaft of a roll driving device 16 (for instance, a water wheel) installed on fixing member 12, is thereby rotated, thus rotates each divided roll 22 in advance, reduces slipping between the roll and the rolled plate, prevents the rolled plate and the roll from a flaw and an uneven wear, and prevents deformation of the roll to be caused by a temperature difference in the roll.

In FIG. 7, the rotating axis of divided roll 22 is supported by two bearings 23 at both ends thereof. Each bearing 23 is composed such that an inner ring thereof supports the rotating axis, and its outer ring is supported by one end portion of arm member 26. Therefore, even if the rolled plate is subjected to a hot rolling process at a high temperature, bearing 23 is satisfactorily shielded from heat transferred from the outer periphery of the roll, so that the bearing 23 is protected from shortening of life to be caused by a temperature rise of the bearing and thermal damage. Taking advantage of this configuration, load detector 28 is also protected from the influence of a high-temperature rolled plate, so measurement errors that might otherwise be caused by temperature variations are avoided.

Referring to FIG. 7, the arm member 26 is composed of a pair of (two) arm panels that support both ends of a divided roll 22. The other end portion of each arm panel is equipped with a protruded portion 26a that can swing around the axial line Y—Y in each fixed member 24. This protruded portion 26a is constructed in such a way that using the aforementioned roll height adjusting device 27 (for instance, a bolt), a swing angle thereof can be adjusted about a center of the axial line Y—Y. In addition, the load detector 28 is installed preferably at both of arm panels in a pair. However, if required, either or both of load detectors 28 can be omitted.

Thus configured, a pair of (two) arm panels strengthen the lateral toughness, contributing to preventing life shortening or damage caused by the rolled plate that it slips sideways. Also, even if the widthwise end portion of the rolled plate is less than the width of the roll, detection accuracy can be prevented from degradation, because only a small moment acts on the shape measuring roll. In addition, a plurality (2 pieces) of load cells (load detectors 28) can be installed in each measuring roll (divided roll 22), and measurements can be backed up.

In the aforementioned shape detecting apparatus 10, divided rolls 22 that contact edges of a rolled plate can be obtained by a calculation, and from positions of these edges on the divided rolls, the tension acting with divided rolls can be calculated, thus tensions acting on the divided rolls in contact with edges of the rolled plate can also be detected precisely.

In addition, all sliding portions of shape detecting units 20 are equipped with sealing members 29 to prevent scale, fluid, etc. from entering from outside, whereby the rotation fulcrum and dynamic force measuring points (load measuring points) are protected from an adverse environment outside, to reduce detrimental effects such as aging alterations and poor measurement accuracy.

According to the above-mentioned configuration of the present invention, since the shape detecting apparatus 10 is configured such that in place of a looper roll of looper device 2, the apparatus can be installed, the shape detecting function can be added to the existing looper device 2 without requiring to replace the entire device. Hence, according to the configuration of the present invention, the tension of a strip corresponding to the width of each roll can be detected, in particular, this configuration can bring a preferred effect to prevent cutting etc. when a thin and wide plate is rolled.

In addition, because a plurality of shape detecting units 20 are fixed in the lateral direction of supporting frame 14, closely to each other in a detachable way, each unit can be replaced independently, so the units can be easily maintained.

Furthermore, the aforementioned configuration can make the shape detecting units 20 small and light, therefore, the weight of the entire looper device can be reduced with a minimum increase of GD2, so that high and quick responses in a looper control system can be maintained.

Summarizing the above descriptions, the shape detecting apparatus according to the present invention provides the following advantages.

(1) The apparatus gives a minimum effect to responses in a conventional looper control system.

(2) The apparatus receives a minimum effect from a detrimental environment.

(3) A detection sensitivity of the apparatus is high and is not affected by temperatures.

(4) The life of roller bearing is extended.

(5) Maintainability is improved.

(6) Rolls can be protected from uneven wears.

(7) The apparatus can be easily installed only by replacing the roll of an existing looper.

More explicitly, the shape detecting apparatus of the present invention provides various advantages including (1) the weight of the entire looper device can be reduced while minimizing an increase of GD2 thereof, and quick responses can be maintained in a looper control system, (2) the apparatus is highly resistant to a lateral stress, and is immune to sideways shifting of a rolled plate in terms of life shortening or damage, (3) the rotation fulcrum and dynamic force measuring points (load measuring points) are not exposed, so the apparatus can withstand an adverse environment substantially without aging deterioration and worsened measurement accuracy, (4) even if the widthwise end portion of the rolled plate is less than one half of the roll width, only a small moment acts on the shape measuring roll, so detection accuracy can be prevented from being lowered, (5) the bearing is shielded from heat transferred from the outer surface of the roll, so the life of the bearing is not substantially affected by a temperature rise thereof, and damage thereof is minimized, (6) a plurality of load cells can be installed per measurement roll to back up measurements, (7) there is a minimum slipping between the roll and the rolled plate, so the rolled plate can be prevented from being flawed, while protecting the roll from an uneven wear, while also a roll deformation due to a temperature difference in the roll can be prevented, (8) measurements are not substantially affected by heat transferred from the rolled plate, so measurement errors caused by temperature variations are small, (9) a shape detecting function can be added to an existing looper device without replacing the entire device, and so forth.

As a matter of course, the present invention should not be limited only to the above-mentioned embodiments, but unless the claims of the present invention are exceeded, there are of course various modifications and corrections. For instance, the apparatus can also be installed on a fixing frame, in place of the swing arm, and be used.

What is claimed is:

1. A shape detecting apparatus for controlling a tension in a rolled plate, comprising;
   a pair of fixing members that are fixed to a pair of installation members respectively,
   a support frame of which both ends are supported by the fixing members, and which extends laterally, and
   a plurality of shape detecting units that are fixed detachably on the support frame, adjacently thereto in the lateral direction,
   the shape detecting unit comprises;
   a cylindrical divided roll in contact with the rolled plate,
   a fixed member that is fixed on the support frame,
   an arm member of which one end rotatably supports the divided roll, and of which the other end is fixed on the fixed member, and
   a load detector for detecting a moment of rotation that acts on the arm member.

2. The shape detecting apparatus specified in claim 1, wherein the one pair of fixing members are configured so as to be installable in place of a looper roll of a looper device.

3. The shape detecting apparatus specified in claim 2, wherein the looper device comprises a pair of looper arms that support a looper roll at one end thereof, and a load cell for detecting force acting on the looper roll, at an intermediate location between a support fulcrum of the looper arm and the one end.

4. The shape detecting apparatus specified in claim 2, wherein the support frame is disposed at far side of a supporting fulcrum of the looper device, thereby the entire shape detecting unit is installed at the far side of the supporting fulcrum.

5. The shape detecting apparatus specified in claim 1, wherein the other end of the arm member is installed swingably on the fixed member, and comprises a roll height adjusting device for adjusting height of the divided roll by controlling a swing angle of the other end.

6. The shape detecting apparatus specified in claim 1, wherein said each divided roll separably contacts the adjacent divided rolls, comprises a rotating shaft for transmitting rotating power thereto, and the rotating shaft separably contacts driving shaft of a roll driving device disposed on the fixing member, and is thereby driven to rotate.

7. The shape detecting apparatus specified in claim 6, also comprising a bearing for supporting the rotating shaft of the divided roll by an inner ring thereof, and an outer ring of the bearing is supported by one end portion of the arm member.

8. The shape detecting apparatus specified in claim 1, wherein the arm member comprises a pair of arm panels that support both ends of the divided roll, and the load detector is disposed at both ends of the divided roll and/or on the arm panels.

9. The shape detecting apparatus specified in claim 1, wherein the divided rolls in contact with edges of the rolled plate are determined by a calculation, and a tension acting from the edges of the divided rolls onto the divided rolls is detected by another calculation.

10. The shape detecting apparatus specified in claim 1, wherein a sliding portion of the shape detecting unit comprises a sealing member for preventing scale and fluid, from entering from outside thereof.

* * * * *